April 9, 1946.  R. HADEKEL  2,397,937
REMOTE CONTROL APPARATUS
Filed Jan. 21, 1944  2 Sheets-Sheet 2
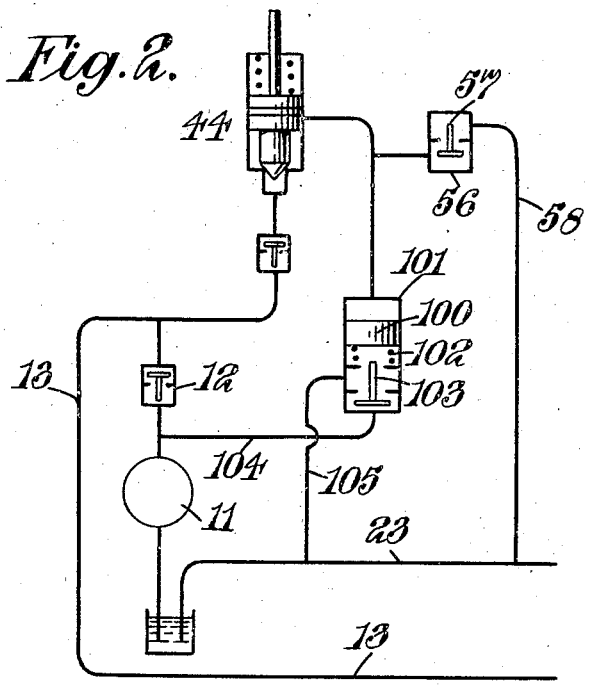
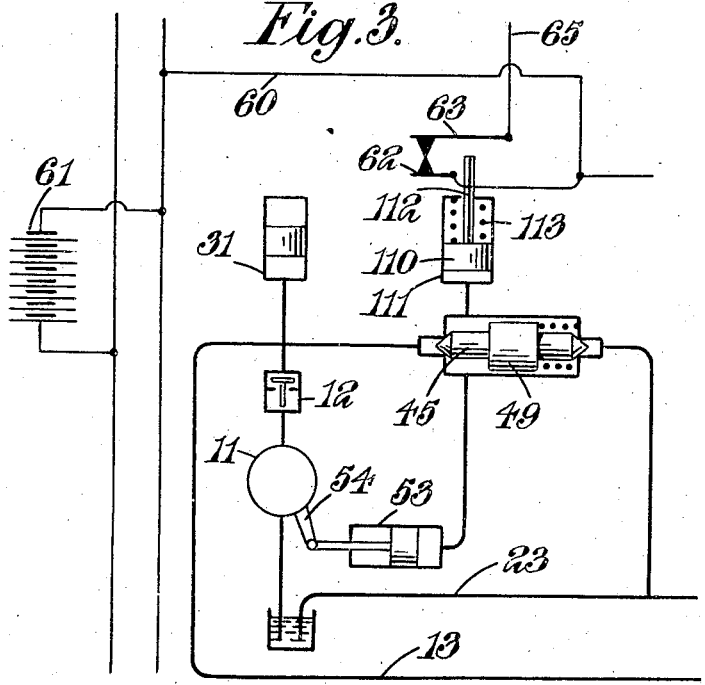
INVENTOR
Ruben Hadekel
By Watson, Cole, Grindle & Watson
ATTYS Patented Apr. 9, 1946

2,397,937

UNITED STATES PATENT OFFICE 2,397,937

REMOTE-CONTROL APPARATUS

Ruben Hadekel, Warrington, England, assignor to Aeronautical & Mechanical Investments Limited, a British company Application January 21, 1944, Serial No. 519,236
In Great Britain November 17, 1942

3 Claims. (Cl. 60—52)

This invention comprises improvements in or relating to remote control apparatus. The invention relates to a control system which may be used, for example, for operating undercarriage bomb doors and the like on aircraft, and in which the apparatus is operated by fluid pressure, the application of the fluid pressure being controlled from a distance by electrical means.

It is an object of the invention to provide such a control system wherein the required operations are performed as far as possible automatically and the electrical devices are automatically de-energised at the completion of an operation which they have initiated.

It is a further object of the invention to provide automatic pump-control means for use in such a system.

One system of the general class described involves fluid pressure actuated jacks which are electrically controlled from a distance by means including connections for putting into operation a hydraulic pump near the jacks when the jacks are to be operated and cutting out of operation the pump when the operation of the jacks is complete, the system being such that a switch, which may be a push button, closes a circuit which leads to the operation of the control valves to the jacks and also to the energisation of the pump, which energisation is maintained as long as the push button is kept closed by the operator.

According to the present invention, however, a remote control apparatus of the kind in which an electric control-circuit is changed by a push-button or other device at a control station in such a manner as to set in operation fluid-pressure-operated apparatus including a pump and a motor at a distant station, is characterised by the fact that an electrical hold-on relay is provided for maintaining the control circuit in the changed condition and the hold-on relay circuit is connected to switch means operated by the fluid pressure apparatus in such a manner that the hold-on is automatically released when the fluid pressure operation is completed.

The hold-on relay may be located at the control station and connected to the switch means operated by the fluid pressure apparatus by an interlock line. The hold-on relay may in this case be combined with the push-button or other device at the control station above referred to whereby the control circuit is changed to set the fluid-pressure-operated apparatus in operation.

Preferably the relay circuit is actuated under the control of a pressure-cut-out device for a pump which is such as to declutch or by-pass the pump automatically when the pressure in the hydraulic circuit reaches the predetermined limit. When the arrangement is such that the pump is automatically declutched there may be combined with the pressure-cut-out device a non-return valve for isolating the declutching pressure circuit so that fall of pressure does not lead to reclutching the pump, which valve is provided with electrical means for opening it when the remote control circuit is changed to set the pump and the actuated devices in operation.

The interlock-line may be arranged to release the hold-on circuit automatically when the pump is declutched, either by direct connection with the declutching device or by connection with a control member which determines the actuation of the declutching device.

There may also be means for interrupting operation of the fluid-pressure-operated apparatus at any desired stage of its movement.

The following is a description, by way of example, of certain constructions in accordance with the invention:

In the accompanying drawings:

Figure 2 is a diagram of a part of another apparatus showing a modification as compared with Figure 1;

Figure 3 is a similar diagram of another modification.

Figure 1:
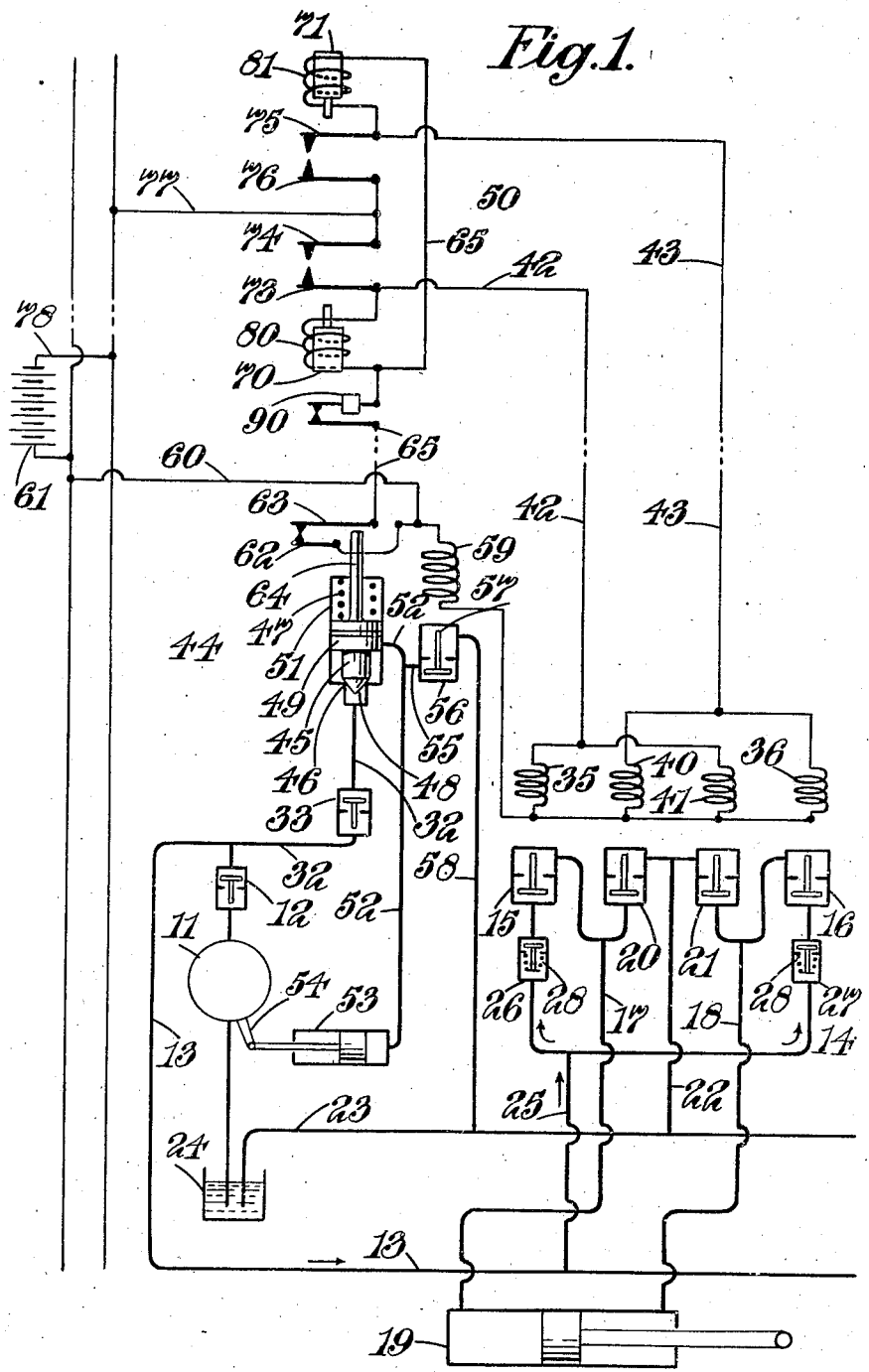
Figure 1 is a diagram of electrical and hydraulic connections of one form of the apparatus.

Referring first to Figure 1, at the station which is to be controlled there is provided a mechanically driven hydraulic pump 11; this may be actuated in any desired manner either by a direct drive from an engine or by an electric motor or otherwise and the means of actuation are not shown in the drawings. The pump delivers through a non-return valve 12 to a pressure line 13 which is connected to an assembly of control valves marked by the general numeral 14 in the drawings. The control valves comprise two supply valves 15, 16 for admitting pressure by way of lines 17, 18, one to one end and the other to the other end of a hydraulic jack 19. There are also two exhaust valves 20, 21 for releasing pressure from the jack and delivering it to return lines 22, 23 which deliver the hydraulic liquid to a reservoir 24 from which the pump 11 draws.

Each of the supply valves 15, 16 is constituted by a lift-valve which opens against the direction in which the flow is intended to take place through it by the connection 25 from the line 13. The two supply valves 15, 16 are fed from the line 13 through non-return valves 26, 27, which close automatically under the influence of springs 28 and act, when the exhaust valves 20, 21 are closed, to lock the hydraulic jack 19 in any position into which it has been moved. The valves 15, 16, 20, 21 are each provided with a valve control magnet 35, 36, 40, 41 respectively such that any one of them will be opened if its magnet is energised. Suitable mechanical constructions of such magnetically controlled valves are known per se. The exhaust valve 21 at one end of the jack 19 and the supply valve 15 at the other end of the jack have their corresponding valve control magnets 35, 41 connected in parallel to one control line 42. The valve control magnets 36, 40 of the other supply and exhaust valves 16, 20 are similarly connected in parallel to a second control line 43. The two control lines 42, 43 are led to a control station 50 which is hereinafter described in detail and which may be located at a distance from the pump 11 and the assembly of control valves 14.

The pressure supply line 13 from the pump 11 may be led to any number of additional sets of supply and exhaust valves similar to 14, each electrically connected by two control lines similar to 42, 43 to the control station and each serving to operate a jack served by pump 11. A branch 32 from the supply line 13 passes through a non-return valve 33 to a pressure-cut-out device 44. The pressure-cut-out device 44 comprises a valve 45 urged towards a seating 46 by a spring 47 and having a pressure face 48 exposed to the pressure in the branch 32 so that when the pressure reaches a predetermined amount the valve 45 will be opened against the spring by the pressure. The valve is mounted on a piston 49 working in a cylinder 51 which lies behind the valve seating 46 so that when the valve is opened by the pressure the pressure will have access to the cylinder 51 and, owing to the larger area afforded by the piston 49, the valve and piston will, once the valve opens, be forced rapidly back to the full extent of its possible movement against the operation of the spring 47 and will there be held until the pressure in the branch 32 beyond the non-return valve 33 falls to a point at which the spring 47 is able to return the piston 49 and valve 45 to the seating 46. The piston 49 is arranged in a cylinder 51 at such a position that when the valve 45 is closed it overlaps a port in the bore of the cylinder connected to a line 52 but when the valve 45 has been forced fully back the port is uncovered and the pressure is thereby admitted to the line 52, which may be designated a "declutching line." The declutching line 52 is connected to a declutching jack 53 operatively connected to a clutch operating lever 54 which operates a clutch (not shown) lying between the pump 11 and the source of power which drives it; in this way as soon as the pressure-cut-out device 44 is operated by pressure in the line 32 pressure is admitted to the declutching jack 53, the clutch is declutched by the lever 54 and the pump ceases to deliver.

The declutching line 52 has a branch 55 which is connected to a valve box 56 in which is a lift-valve 57 so arranged as to tend to be held seated by the pressure in the declutching line 52. Behind the lift-valve 57 the valve box 56 is connected to an exhaust line 58 leading to the line 23 and the sump 24; thus if the lift-valve 57 is opened it will tend to release pressure from the declutching line 52. For the purpose of opening the lift-valve 57 there is provided a magnet, which may be designated the "reclutching magnet" and which is arranged so that when energised it will open the valve. The reclutching magnet 59 is connected in series with the aforesaid valve-control magnets 35, 36, 40, 41 on the opposite side of these magnets from the control lines 42, 43. From the reclutching magnet 59 a connection 60 is made to one pole of a source of electric supply 61. Thus whenever any of the valve-control magnets 35, 36, 40, 41 are energised the reclutching magnet 59 will be energised also and the lift-valve 57 will be opened. The effect of opening this valve is to release pressure from the declutching jack 53 and therefore to permit the clutch of the pump 11 to be re-engaged. Therefore whenever a control line such as 42, or 43, is energised to actuate a jack, such as the jack 19, in the system, the re-clutching valve 57 will be automatically opened, the pump will be re-clutched and set in operation and the necessary hydraulic supply under pressure will be available to operate the jack. When the jack has completed its movement there will be a tendency for the hydraulic pressure to rise, the pressure-cut-out device 44 will operate to admit pressure to the line 52 and the pump will be declutched.

In order that declutching of the pump should be satisfactorily accomplished it is essential that the re-clutching valve 57 should be closed before the port in the wall of the cylinder 51 which is connected to the declutching line 52 is uncovered by the piston 49. To this end a pair of contacts 62, 63 are provided close to the pressure-cut-out 44 and the piston 49 is provided with a tail rod 64 which extends out beyond the cylinder 51 and serves, when the valve 45 is opened, to engage the contact spring of the contact 63 and to break the circuit of the contacts. The contacts 62, 63 are connected between the line 60 which supplies the reclutching magnet 59 and an interlock line 65. The interlock line 65 is led to the distant electric control station 50 and there serves to determine the actuation of hold-on devices as hereinafter explained. Thus the contacts 62, 63 may be designated hold-on interlock contacts.

At the control station 50 there are two push buttons 70, 71 for each jack, such as the jack 19, which is to be operated. The push button 70 closes a pair of contacts 73, 74 connected to the control line 42 and the push button 71 closes a pair of contacts 75, 76 connected to the control line 43. The other poles of the contacts are connected together and by a line 77 to the opposite pole 78 of the electric supply to that to which the line 60 is connected which is joined to the reclutching magnet 59. Thus, if the push button 70 is actuated it closes the circuit of the control line 42, energises the valve control magnets 35, 41 so as to connect the line 17 of the jack 19 to the pressure supply and the line 18 to exhaust; at the same time the reclutching magnet 59 is energised and starts the pump 11. If the push button 71 is operated the magnets 36, 40 will be energised and the jack 19 will be operated in the reverse direction, the operation of the pump being commenced in the same way as before.

The interlock line 65 is connected to two hold-on magnets 80, 81 which are arranged in parallel with one another. The hold-on magnet 80 serves to hold-on the push button 70 when the latter has been operated and similarly the hold-on magnet 81 serves to hold-on the push button 71. It will be noted that the hold-on magnets are connected to the lines 42, 43 respectively so that they become energised through the interlock line 65 and the connection 77 as soon as their respective push buttons are closed. Thus the operator can, after closing either of the push buttons, release his hand and the push button contacts will remain closed as long as the jack 19 is operating until the pressure-cut-out device 44 breaks the circuit of the interlock line at the contacts 62, 63. The length of the tail rod 64 is such that the breaking of the circuit of the interlock line 65 occurs before the opening of the port leading to the declutching line 52. The effect is that the hold-on magnet which is in operation at any given occasion is de-energized and its control line 42, or 43, as the case may be, is disconnected, the corresponding valve control magnets, and also the reclutching magnet 59 are de-energized and the reclutching valve 57 is allowed to close. This being the case the final movement of the piston 49 of the pressure-cut-out 44, when it uncovers the port in the wall of the cylinders, will be able to produce pressure in the re-clutching line 52 and stop the pump. The parts in this position are ready for another operation of the push button whenever the operator so desires. If desired another push button 90 may be arranged at the control station 50 in the interlock line 65, which will break this line. If the push button 90 is pushed at any stage of the operation of a jack on the system the effect is to break the hold-on circuit, to de-energise the valve control magnets and the reclutching magnet and to arrest the jack of the stage of movement which it has reached. Thus it is possible to move any jack to any desired extent and then to stop it. Unless the push button 90 is utilised, however, the actuation of push button 70 or 71 serves to initiate a jack movement which is automatically carried on to completion.

It will be noted that with this system the pump 11 will only be in operation when a jack is required to be moved and thus wear on the pump is reduced to a minimum; the hydraulic circuits, although on the drawing appearing extended, can all be kept close together, as the pump 11 and the valve assembly 14 can be located close to the jack 19 and thus risks of leakage through damage to the hydraulic circuit are minimised; moreover, as soon as the operation is completed the operator gets an indication automatically because he sees the push button which he has depressed, 70 or 71 as the case may be, spring back to its initial position. If desired the push buttons can be arranged so that they contain an electric lamp which is illuminated while they are depressed and extinguishes itself upon the push button returning to its inoperative position.

The push buttons may be mechanically interlinked by a lever if desired so that when one is in the other is out and vice versa. Alternatively they may be left so that their movements are independent of each other and in this case it is possible in emergency to depress both buttons 70 and 71 together, which will open all the valves controlling jack 19 and thereby unlock it and permit the parts which it controls to move by gravity or under some other biasing force towards one extreme of the movement, which is arranged to be the one to which the parts ought to move under emergency conditions. For example in the case of an aircraft under-carriage the depression of both push buttons may serve to lead to the extension of the undercarriage under the effects of gravity. If this is done the interlock push buttons 94 should be operated after the parts have reached their final position so as to release the hold-on magnets and obviate any risk that the solenoids might remain in circuit permanently. It will be appreciated that the emergency operation would only be brought about if through some undesired contingency the hydraulic operating pressure from the pump is not available, in which case the hold-on interlock contacts on the pressure-cut-out will not be opened; hence the importance of the operator himself breaking the interlock circuit.

Although the construction has been described in relation to a pump which is declutched by a jack it will be understood that other means for throwing the pump out of operation than a clutch and a jack might be adopted.

For example, as shown in Figure 2, the pressure-cut-out 44 may deliver pressure fluid to a piston 100 in a cylinder 101, which piston, under the effect of pressure is operated against a spring 102 and serves to open a by-pass valve 103 which closes again upon the pressure being relieved. The by-pass valve is connected by pipes 104, 105 between the pump outlet and the return line 23 and therefrom when opened by-passes the delivery of the pump. The other parts shown are similarly lettered to those in Figure 1 and similarly operated, and, of course, a valve assembly 14 and push button controlled by lines 42, 43 would be included to complete the arrangement.

Again, in some cases, instead of using the electric circuit to operate a reclutching valve and make the pump cut into operation when delivery is required it is possible to utilise a system in which the pump is both cut in and cut out in response to the hydraulic pressure variations in the system. Figure 3 shows the parts of this arrangement in so far as they differ from Figure 1. The reclutching magnet 57 is omitted and the valve control magnets 35, 36, 40, 41 would be connected directly by line 60 to the one pole of the electric supply. The interlock contacts 62, 63 are actuated by a piston 110 in a cylinder 111 having a piston rod 112 to break the contacts and a spring 113 to resist the movement of the piston. The piston is moved in the direction in which the interlock line 65 is broken by a pressure applied by the control valve 45 which operates the declutching jack 53.

In the case of the construction illustrated in Figure 3 it is necessary to fit an accumulator 31 on the output circuit so as to ensure that when the pump is cut out the pressure-drop resulting is not sufficient to make it cut in again.

I claim:

1. In electrically remote-controlled hydraulic apparatus, the combination of a constant-direction power-driven pump, hydraulic apparatus connected to the delivery of the pump, valve means for determining the direction of operation of said hydraulic apparatus, electromagnetic means for operating said valve means, switch means at a control station electrically connected to the electromagnetic means for determining the operation of said electromagnetic means, which switch means are biassed to return, when not controlled, to the inoperative condition, electrical hold-on relay means for maintaining the switch means operative, a hydraulically-operated electric switch connected to the pump delivery so that upon rise of hydraulic pressure at the completion of an operation of the hydraulic apparatus driven by the pump the last said switch is operated, and an interlock line extending from said switch to the hold-on relay means at the control station to release the same when the switch is operated, the hydraulically-operated electric switch serving also to operate a pressure-cut-out device which throws the pump automatically out of operation when the switch is actuated by rise of hydraulic pressure.

2. In electrically remote-controlled hydraulic apparatus, the combination of a constant-direction power-driven pump, hydraulic apparatus connected to the delivery of the pump, valve means for determining the direction of operation of said hydraulic apparatus, electromagnetic means for operating said valve means, switch means at a control station electrically connected to the electromagnetic means for determining the operation of said electromagnetic means, which switch means are biassed to return, when not controlled, to the inoperative condition, electrical hold-on relay means for maintaining the switch means operative, a hydraulically-operated electric switch connected to the pump delivery so that upon rise of hydraulic pressure at the completion of an operation of the hydraulic apparatus driven by the pump the last said switch is operated, an interlock line extending from said switch to the hold-on relay means at the control station to release the same when the switch is operated, a clutch for driving the pump, a cylinder-and-piston device for declutching the pump and hydraulic connections from the cylinder-and-piston device to the said hydraulically-operated electric switch so that when the switch is operated the pump is declutched.

3. Electrically remote-controlled hydraulic apparatus as claimed in claim 2, having a non-return valve for isolating the declutching cylinder-and-piston device so that fall of pressure does not lead to declutching the pump, and an electromagnet electrically connected to the control station for opening said non-return valve when the switch means at the control station is operated.

RUBEN HADEKEL.